(12) United States Patent
Sakagami et al.

(10) Patent No.: US 7,637,478 B2
(45) Date of Patent: Dec. 29, 2009

(54) SEAT RING WITH INSERT FOR BUTTERFLY VALVE, AND MANUFACTURING METHOD THEREOF

(75) Inventors: Tatsuya Sakagami, Nobeoka (JP); Norimitsu Kai, Nobeoka (JP)

(73) Assignee: Asahi Organic Chemicals Industry Co., Ltd., Miyazaki (JP)

( * ) Notice: Subject to any disclaimer, the term of this patent is extended or adjusted under 35 U.S.C. 154(b) by 389 days.

(21) Appl. No.: 10/555,145

(22) PCT Filed: May 6, 2004

(86) PCT No.: PCT/JP2004/006467

§ 371 (c)(1), (2), (4) Date: Mar. 1, 2007

(87) PCT Pub. No.: WO2005/103537

PCT Pub. Date: Nov. 3, 2005

(65) Prior Publication Data

US 2008/0023664 A1    Jan. 31, 2008

(30) Foreign Application Priority Data

May 1, 2003    (JP) .......................... 2003-126795

(51) Int. Cl.
*F16K 1/42* (2006.01)
(52) U.S. Cl. ........................... 251/306; 251/360
(58) Field of Classification Search ............. 251/306, 251/307, 360–363, 359
See application file for complete search history.

(56) References Cited

U.S. PATENT DOCUMENTS

| | | | | | |
|---|---|---|---|---|---|
| 3,341,170 | A | * | 9/1967 | Housworth | 251/306 |
| 3,502,299 | A | * | 3/1970 | Phillips | 251/306 |
| 3,727,883 | A | * | 4/1973 | Conners et al. | 251/306 |
| 4,006,882 | A | * | 2/1977 | Bonafous | 251/306 |
| 4,259,980 | A | * | 4/1981 | Muller | 251/306 |
| 4,516,597 | A | * | 5/1985 | Ueda | 251/306 |
| 4,552,332 | A | * | 11/1985 | Sonderegger et al. | 251/306 |
| 5,876,015 | A | * | 3/1999 | Schaeffer et al. | 251/306 |

FOREIGN PATENT DOCUMENTS

| | | |
|---|---|---|
| JP | 61-130672 | 6/1986 |
| JP | 63-135663 | 6/1988 |
| JP | 4-019961 | 2/1992 |
| JP | 9-242884 | 9/1997 |
| JP | 9-273637 | 10/1997 |
| JP | 2972566 | 8/1999 |

* cited by examiner

*Primary Examiner*—John Bastianelli
(74) *Attorney, Agent, or Firm*—Jordan and Hamburg LLP

(57) ABSTRACT

A seat ring has an insert for a butterfly valve configured so that an annular insert is fitted on the outer peripheral surface of the seat part in which there is provided a valve body fitting annular groove having side wall parts on both the upstream side and downstream side, wherein there are provided on the outer peripheral surface of the insert a step so that the outer diameter on the downstream side is smaller than the outer diameter on the upstream side and on the inner peripheral surface a locking projection, and the insert is fitted in an annular groove provided in the valve body fitting annular groove of the seat part.

5 Claims, 11 Drawing Sheets

SEAT RING WITH INSERT FOR BUTTERFLY VALVE, AND MANUFACTURING METHOD THEREOF

BACKGROUND OF THE INVENTION

The present invention relates to a seat ring for a butterfly valve suitable for use in pipe lines for a chemical factory, water supply and sewage, agriculture, fishery and the like; more specifically, it relates to a seat ring with insert for a butterfly valve that improves valve seat sealing performance, valve stem sealing performance, and flange surface sealing performance.

A conventional seat ring with insert for a butterfly valve, as shown in FIG. 9, is configured such that an annular insert 101 comprising a single step 103 having a different outer diameter size and a seat ring 104 formed of rubber and embedded so that the outer peripheral surface thereof forms a single surface with the outer peripheral surface of the insert 101, are fitted in a valve body 110 having on the inner surface thereof a step 111 that engages with the step 103 of the insert 101, so that a valve shaft hole center 108 of the seat ring 104 and valve shaft hole center 112 of the valve body 110 are coaxial in the tube stem direction. In this case, the seat ring 104 protrudes from both ends of the valve body 110.

Because when the butterfly valve in which the seat ring 104 is fitted onto a pipe, the step 103 of the insert 101 and the step 111 of the valve body 110 are in direct contact with each other, a load acting as shear stress on the valve shaft 113 is reduced, and operating torque of the valve shaft 113 is reduced, thereby improving valve stem sealing performance. Further, because lateral portions 105, 106 of the seat ring 104 are compressed to a suitable degree, a suitable flange surface sealing effect between the seat ring lateral surface and piping flange surface can be achieved.

Further, in a conventional method for manufacturing a seat ring with insert for a butterfly valve, as shown in FIG. 10, the step 103 formed on the outer peripheral surface of the insert 101 is engaged with a step 118 formed in advance on the inner diameter portion of an outer die 117; thereafter, in a state where the valve shaft hole 102 is supported by a valve stem pin, and the insert 101 is fixed on the inner surface of the outer die 117, rubber is inserted and molded. The effect thereof is that when a seat ring with insert is molded, without need for a complicated mechanism, positioning in the tube stem direction only of the insert 101 is easily accomplishing using the step 103 as a reference. For example, see Japanese Patent 2972566 (Pages 1-6, FIGS. 1 and 4).

However, the above prior art has the following problems.

(1) As shown in FIG. 11, when a conventional butterfly valve in which a seat ring is fitted is connected to piping flanges 115, 116, or when a conventional butterfly valve is subject to fluid pressure in a fully closed state after connection, only the seat ring 104 is subject to a force causing displacement and deformation in the downstream side direction from a valve body 114 that has been subject to a tightening force for fixing the piping flanges 115, 116 or fluid pressure. While displacement in the tube stem direction of the seat ring 104 can be inhibited by the direct contact between the step 103 of the insert 101 and the step 111 on the inner surface side of the valve body 110, deformation of the seat part 109 along the entire inner periphery of the seat ring cannot be inhibited, resulting in deformation of the portion of the seat ring 104 in press contact with the valve body 114, and thus lowering valve seat sealing performance.

(2) When a conventional butterfly valve in which a seat ring is fitted is connected to the piping flanges 115, 116, it is not the case that the lateral portions 105, 106 of the seat part 109 of the seat ring 104 are compressed uniformly along the entire periphery in the horizontal direction only, but because they deform irregularly in the flow channel inward radial direction or outward radial direction (direction of the arrows of FIG. 11), the compression rate becomes uneven, and flange surface sealing performance is lowered.

(3) When the seat ring 104 is to be fitted on the valve body 110, positioning in the peripheral direction is difficult, so that when the valve shaft 113 is inserted, there is peeling off of the valve shaft hole portions of the seat ring 104 and insert 101, damaging the valve stem sealing 107 of the seat ring 104, and lowering valve stem sealing performance. Further, uncertain positioning in the peripheral direction causes an increase in operating torque.

(4) In the manufacture of a seat ring 104, when the insert 101 is set inside the outer die 117, positioning of the insert 101 in the peripheral direction is difficult; therefore, if the valve stem pin is inserted in a state where the insert 101 is displaced, the valve shaft hole 102 of the insert 101 will become deformed, causing an increase in operating torque and degraded valve stem sealing performance.

SUMMARY OF THE INVENTION

The present invention was conceived in light of the above problems of the prior art, and its object is to provide a seat ring with insert for a butterfly valve that improves valve seat sealing performance, valve stem sealing performance, and flange surface sealing performance, and enables the easy and reliable alignment of a valve stem in the manufacture of the seat ring and in the assembling of the valve body, and a method of manufacturing the same.

DISCLOSURE OF THE INVENTION

The constitution of the present invention will be explained with reference to FIGS. 1 through 3 and FIGS. 6 through 8. The first feature is a seat ring with insert for a butterfly valve 9 comprising an annular insert 1 fitted in a seat part 10 fitted on the valve body inner peripheral surface and comprising a valve body annular groove for fitting 11 having side wall parts 13, 14 on both the upstream side and downstream side, wherein there are provided on an outer peripheral surface of the insert 1 a step 2 so that the outer diameter on the downstream side is smaller than the outer diameter of the upstream side, and on the inner peripheral surface a locking projection 5, and the insert 1 is fitted in the annular groove 12 provided within the valve body annular groove for fitting 11 of the seat part 10.

The second feature is that the side wall part 14 on the downstream side of the valve body annular groove for fitting 11 of the seat ring with insert 9 has a thickness of 2-5 mm, and the third feature is that there is provided a fitting groove 8 or fitting protrusion on the outer peripheral surface of the insert 1 in the tube stem direction.

In the manufacturing method for the seat ring with insert for a butterfly valve 9, a die comprising an outer die 32, upper die 38 and lower die 39 is used, and the insert 1 having the fitting groove 8 or fitting protrusion on the outer peripheral surface thereof engages with a fitting protrusion 33 or fitting groove formed on the inner peripheral surface of the outer die 32, the outer die 32, being in a state where the insert 1 is engaged with the inner surface thereof, is sandwiched between the upper die 38 and lower die 39, and rubber is injected in the die in a state where the stem cores 34, 35 are fitted in the stem core through holes 36, 37 provided on the outer die 32, thus molding the seat part 10.

It is preferable that the side wall part 14 on the downstream side of the seat ring with insert 9 be molded so as to be a thin wall; more specifically, it is preferable that it be molded so as to have a thickness of 2-5 mm. With this configuration, sufficient surface pressure is ensured when a flange is connected, and flange surface sealing performance is improved; further, deformation in the assembly of the insert with the valve body 18 is facilitated, and workability at time of assembly is markedly improved.

BRIEF DESCRIPTION OF THE DRAWINGS

An embodiment of the present invention will be explained with reference to FIGS. 1 through 8, but the present invention should not be construed as being limited to the present embodiment.

DETAILED DESCRIPTION OF THE INVENTION

Figure 1:
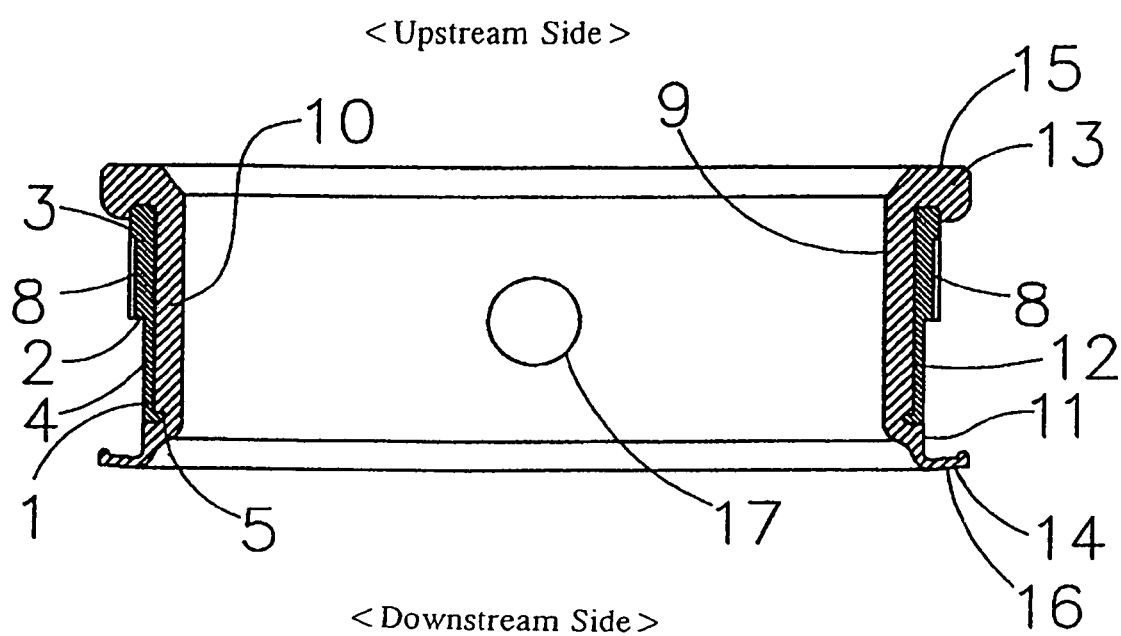
FIG. 1 is a cross-sectional lateral view of a seat ring with insert for a butterfly valve according to the present invention.
Figure 2:
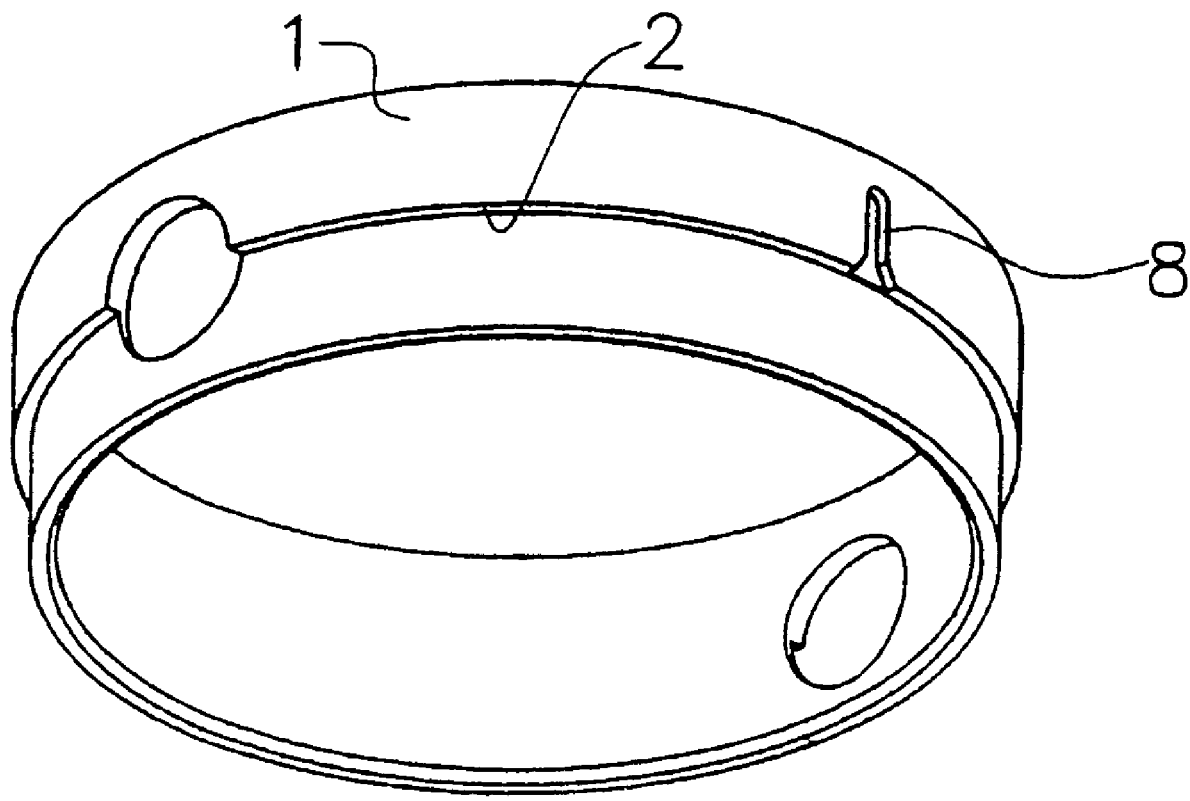
FIG. 2 is an oblique view of an insert to be fitted in the seat ring with insert of FIG. 1.
Figure 3:
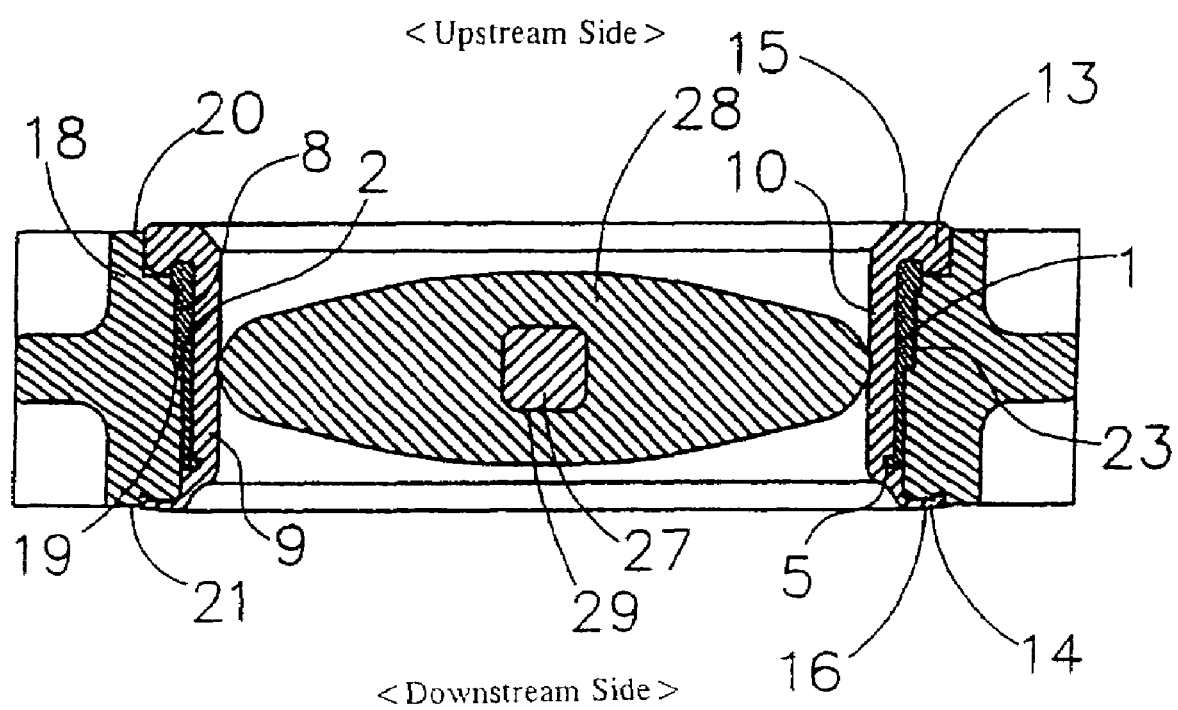
FIG. 3 is a cross-sectional lateral view of a butterfly valve in which the seat ring with insert of FIG. 1 is fitted.

The invention will be explained in detail, with reference to the drawings.

In the drawings, 1 is an insert formed of SUS304. Along the entire outer periphery thereof there is continuously provided a step 2 such that the diameter of an outer peripheral surface 3 on the upstream side is larger than the diameter of an outer peripheral surface 4 on the downstream side, and on the outer peripheral surface 3 on the upstream side, two fitting grooves 8 having different widths and open in the downstream direction are positioned 90° in the peripheral direction from a valve shaft hole 17. Further, there is provided a locking projection 5 along the entire inner periphery on the downstream side end.

In this embodiment, the material for the insert 1 is SUS304, but is not limited thereto. Alternatively, a rigid body such as a metal or hard resin that is not deformed even by a flange tightening force may be used. Further, while the step 2 is provided around the entire periphery in a continuous manner, it may be intermittently provided, and one step 2 or a plurality of steps 2 may be provided. Further, while there are provided two fitting grooves 8 having different widths from each other, as long as it is provided on the outer peripheral surface, a single fitting groove 8 may be provided, or more than one fitting groove 8 may be provided. Further, a locking projection 5 is provided in a continuous manner along the entire periphery on the downstream end, but as long as it is provided on the inner periphery, it may be provided either continuously or intermittently.

10 is a seat part formed of EPDM, and there are provided on the outer peripheral surface thereof a side wall part 13 on the upstream side and side wall part 14 on the downstream side constituting a valve body annular groove for fitting 11, and the side wall part 14 on the downstream side is formed to be thin-walled, in this case, to have a thickness of 3 mm. Further, there is provided on the bottom thereof an annular groove 12 having a shape enabling the insert 1 to be fitted therein, and the insert 1 is fitted therein.

In the present embodiment, the material for the seat part 10 of the seat ring with insert 9 is EPDM, but no particular limitations are placed thereupon provided it is an elastic body such as rubber. Further, while the side wall part 14 on the downstream side has a thickness of 3 mm, a thickness in the range of 2-5 mm is acceptable, preferably, 2.5-3.5 mm. Such a configuration ensures sufficient surface pressure when a flange is connected, thereby improving flange surface sealing performance. Further, when assembling with the valve body 18, deformation is facilitated and workability when assembling is notably improved.

If a butterfly valve of the present embodiment in which the seat ring with insert 9 is fitted is used for a valve body such as a wafer type, lug type, double flange type or the like, when subject to fluid pressure in a fully closed state, the seat part 10 of the seat ring with insert 9 receives a force capable of causing deformation from a valve body 28 that has received such fluid pressure. However, because the locking projection 5 is provided on the inner peripheral surface of the insert 1, deformation is not caused by the valve body that received such fluid pressure, such deformation being a problem of the prior art. As a result, deformation of the press contact portion with the valve body 28 of the seat ring with insert 9 is inhibited, and the valve seat sealing performance is improved.

Figure 4:
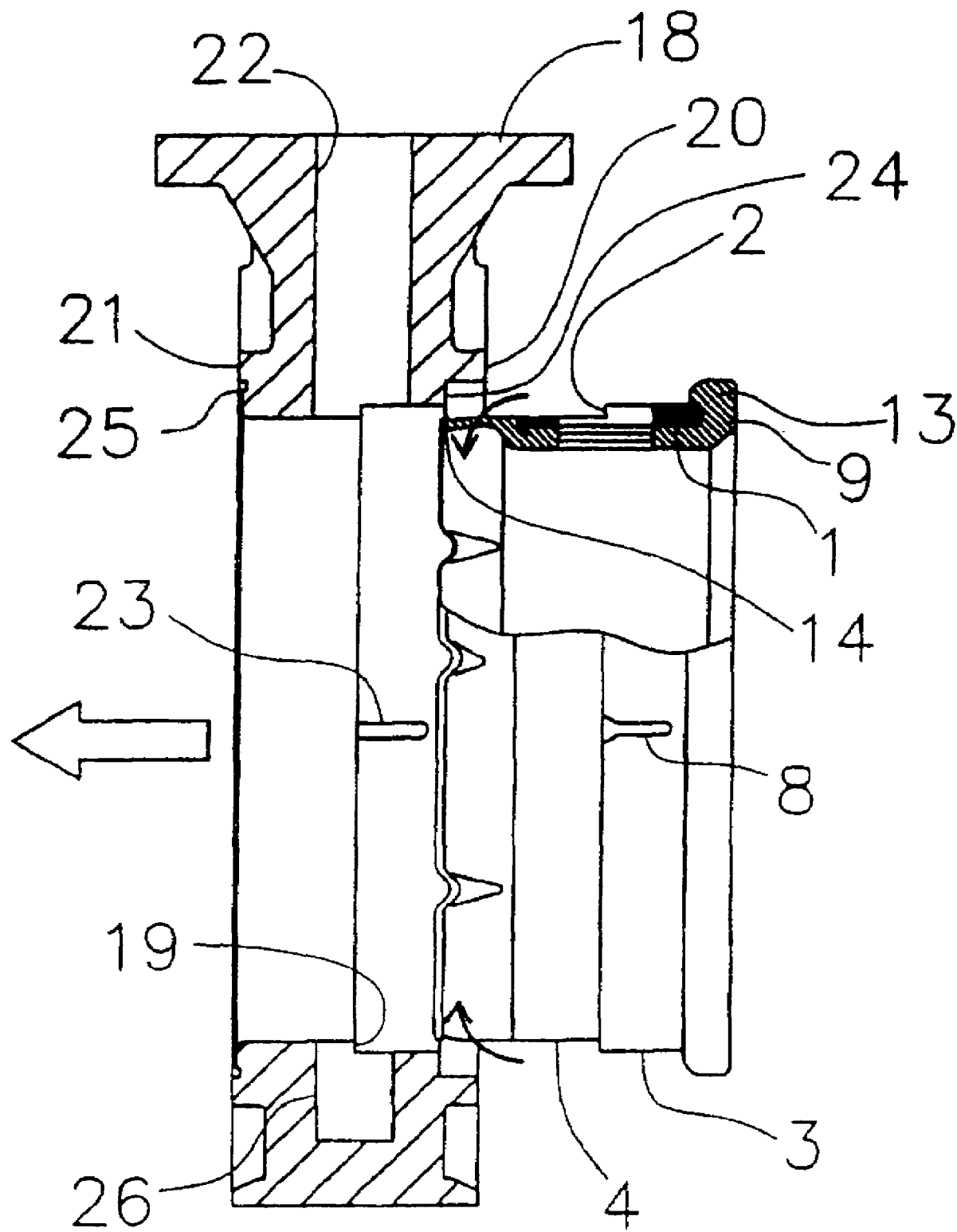
FIG. 4 is a vertical cross-sectional view showing a state where the seat ring with insert of FIG. 1 is fitted into a valve body.

Next, a butterfly valve assembling method will be explained. First, in a valve body 18 having, on its inner peripheral surface, a step 19 capable of engaging with the step 2 of the insert 1 fitted in the seat ring with insert 9, and a fitting protrusion 23 capable of fitting in the fitting groove 8 of the insert 1, the side wall part 14 on the downstream side formed into a thin wall of the seat ring with insert 9 of the present embodiment is inserted from the upstream side in the direction of the arrow of FIG. 4 while being deformed at the downstream side. At this time, because the side wall part 14 on the downstream side is formed into a thin wall (3 mm in the present embodiment), deformation is facilitated, and the seat ring with insert 9 can be easily inserted without the valve body 18 being a divided type, thereby making assembly very easy. Next, further insertion is made at the downstream side so that the fitting groove 8 of the insert 1 of the seat ring with insert 9 and the fitting protrusion 23 inside the valve body 18 are fitted together, such insertion to continue until the step 2 of the insert 1 and the step 19 inside the valve body 18 are engaged with each other. Concurrently therewith, the side wall part 14 on the downstream side returns to its original shape, fitting in the fitting groove 25 on the downstream side of the valve body 18 in a sealed state, and the side wall part 13 on the upstream side is fitted to the fitting groove 24 on the upstream side in a sealed state. Next, the valve body 28 is fitted in the flow channel of the seat ring with insert 9 so that the valve shaft hole 22 of the valve body 18 and the valve shaft hole 29 of the valve body 28 match in a fully open state or half open state. Further, the valve shaft 27 is inserted from the valve shaft hole 22 on the upper portion of the valve body 18 and is caused to reach the bottom of a valve shaft receiver 26, and a drive unit is attached to the upper portion of the valve shaft 27 protruding from the upper portion of the valve body 18.

At this time, because the widths of the fitting grooves 8 of the outer peripheral surface 3 on the upstream side of the insert 1 differ from each other, and only the corresponding fitting groove can be fitted by the respective fitting protrusion 23 on the inner periphery of the valve body 18, positioning in the peripheral direction is easy, mis-assembling the same in an upside down manner is prevented, and because the valve shaft 27 is not subject to a shear stress load, operating torque is reduced, valve stem sealing performance is thereby improved. Further, because the step 2 is provided on the outer peripheral surface, no displacement occurs in the tube stem direction with respect to the valve body 18 of the seat ring with insert 9, allowing easy and accurate positioning in the tube stem direction of the valve shaft hole 22 of the valve body 18 and the valve shaft hole 17 of the seat ring with insert 9.

Figure 5:
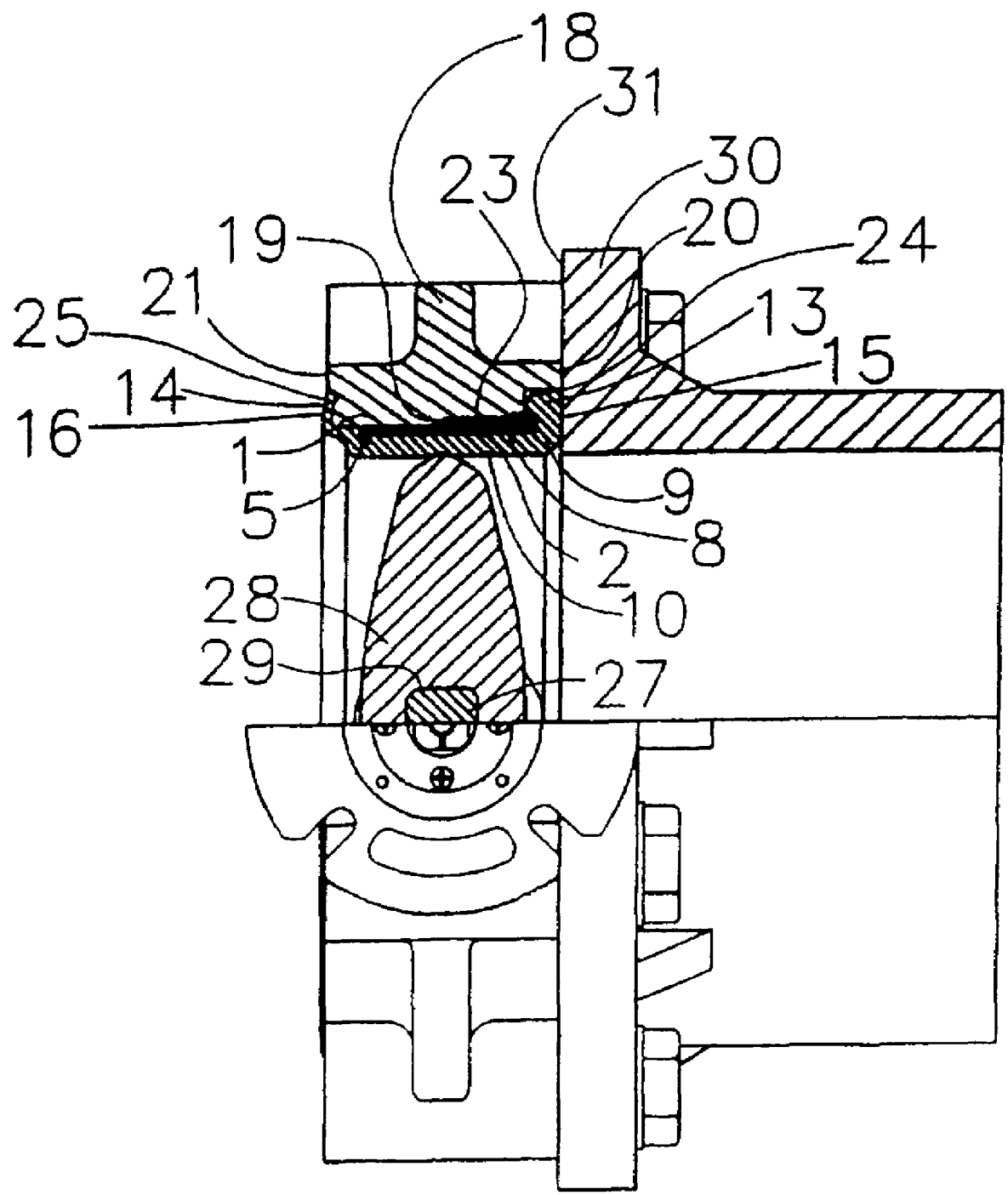
FIG. 5 is a partial cross-sectional plan view showing a state where the butterfly valve of FIG. 3 is connected to piping.

Next, with reference to FIG. 5, explanation will be made of a case where the butterfly valve is connected to a piping flange using a bolt. When the butterfly valve is connected to the piping flange 30, the lateral surface 20 of the valve body 18 and the flange surface 31 are pressed against each other by a piping flange tightening force, and the step 2 provided on the outer periphery of the insert 1 of the seat ring with insert 9 and the step 19 provided on the inner periphery of the valve body 18 are pressed against each other. At this time, because the side wall part 13 on the upstream side of the seat ring with insert 9 is fitted in the fitting groove 24 on the upstream side of the valve body 18 and compressed by a tightening force of the piping flange 30, the seat ring lateral surface 15 on the upstream side is suitably compressed without being irregularly deformed in the inward radial direction or outward radial direction of the flow channel, and the seat ring lateral surface 15 on the upstream side and flange surface 31 can be securely sealed, thereby improving flange surface sealing performance. Because the foregoing also applies to the lateral surface 21 on the opposite side of the valve body 18, and the seat ring lateral surface 16 on the downstream side can be suitably compressed, a secure seal can be achieved and flange surface sealing performance is improved.

Further, because even when only the seat ring with insert 9 receives a force causing displacement and deformation in the downstream side direction from the valve body 28 which was subject to a tightening force of the piping flange 30 or fluid pressure, tube stem direction displacement of the seat ring with insert 9 is inhibited by press contact between the step 2 provided on the outer peripheral surface of the insert 1 of the seat ring with insert 9 and the step 19 provided on the inner peripheral surface of the valve body 18. As a result, the valve shaft 27 is not subject to shear stress, valve stem sealing performance is improved and increase in operating torque is prevented. Further, because the locking projection 5 provided on the inner peripheral surface of the insert 1 inhibits deformation of the seat part 10 of the seat ring with insert 9, deformation of the press contact portion with the valve body 28 of the seat ring with insert 9 is inhibited, thereby improving valve seat sealing performance. While the above effects can be achieved both for piping on both sides and piping on one side, they are particularly effective for piping on one side.

Figure 6:
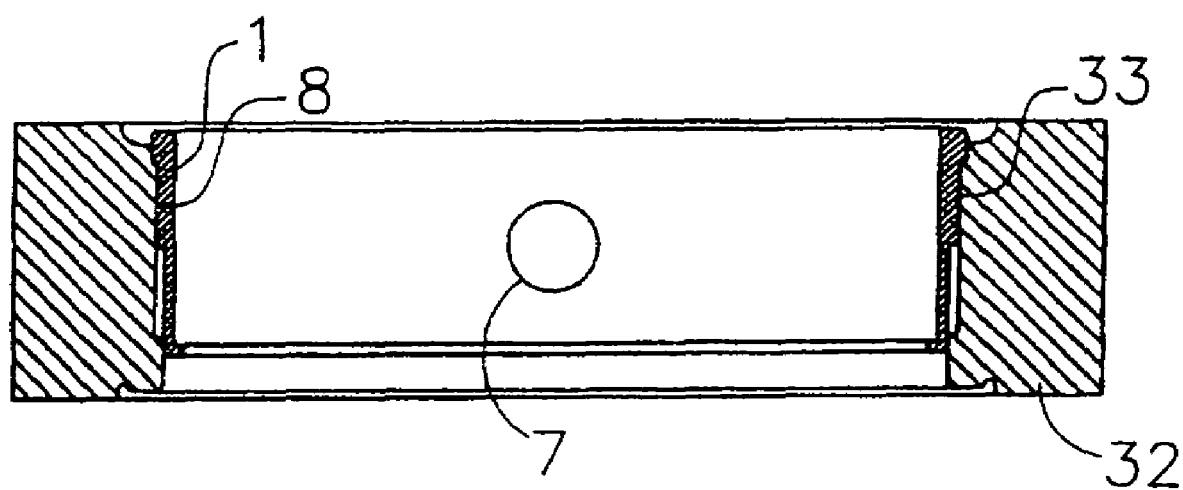
FIGS. 6 and 7 are cross-sectional lateral views showing a method for manufacturing a seat ring with insert of the present invention.
Figure 7:
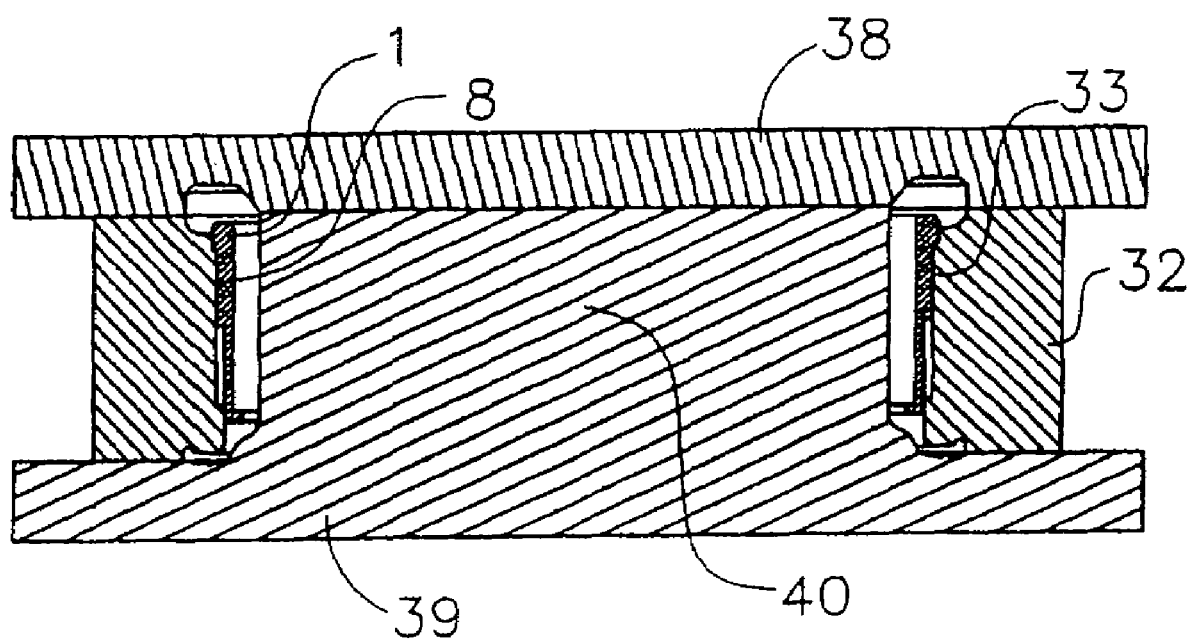
Figure 8:
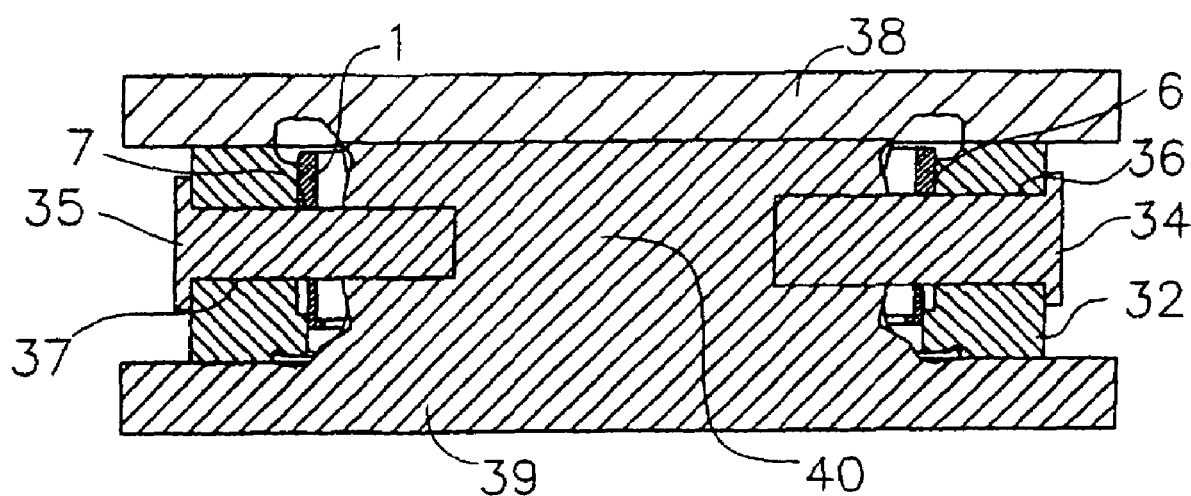
FIG. 8 is cross-sectional lateral view shifted 90 degrees from the view in FIGS. 6 and 7.
Figure 9:
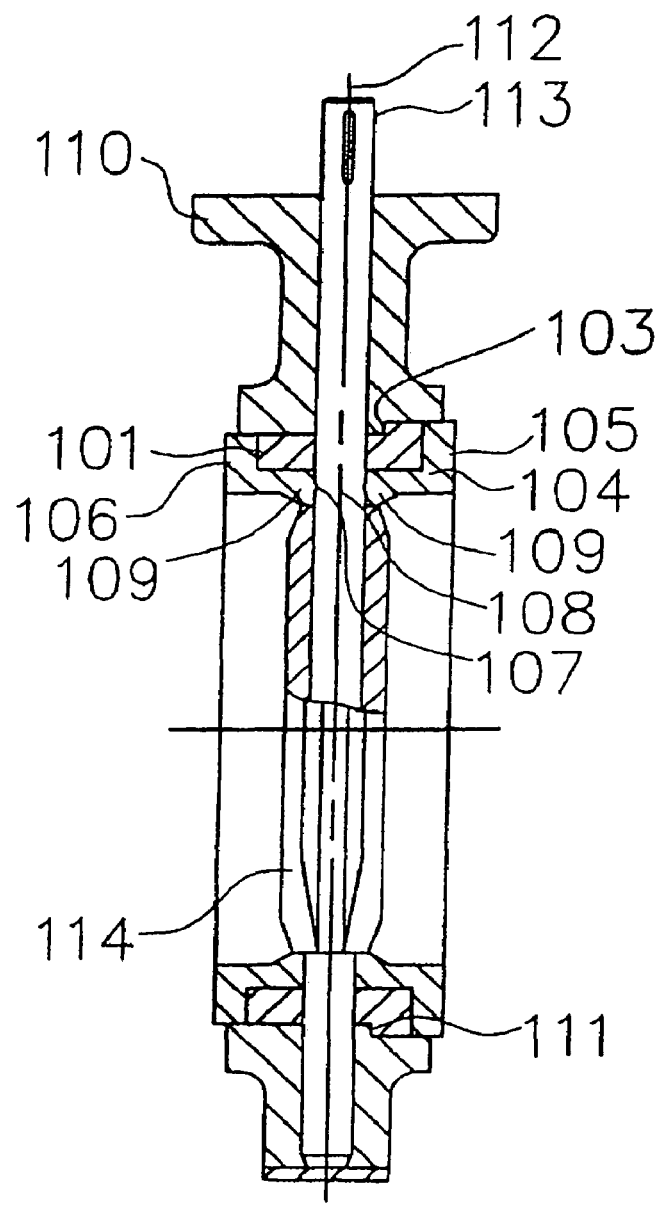
FIG. 9 is a partial vertical cross-sectional view of a butterfly valve in which a conventional seat ring with insert is fitted.
Figure 10:
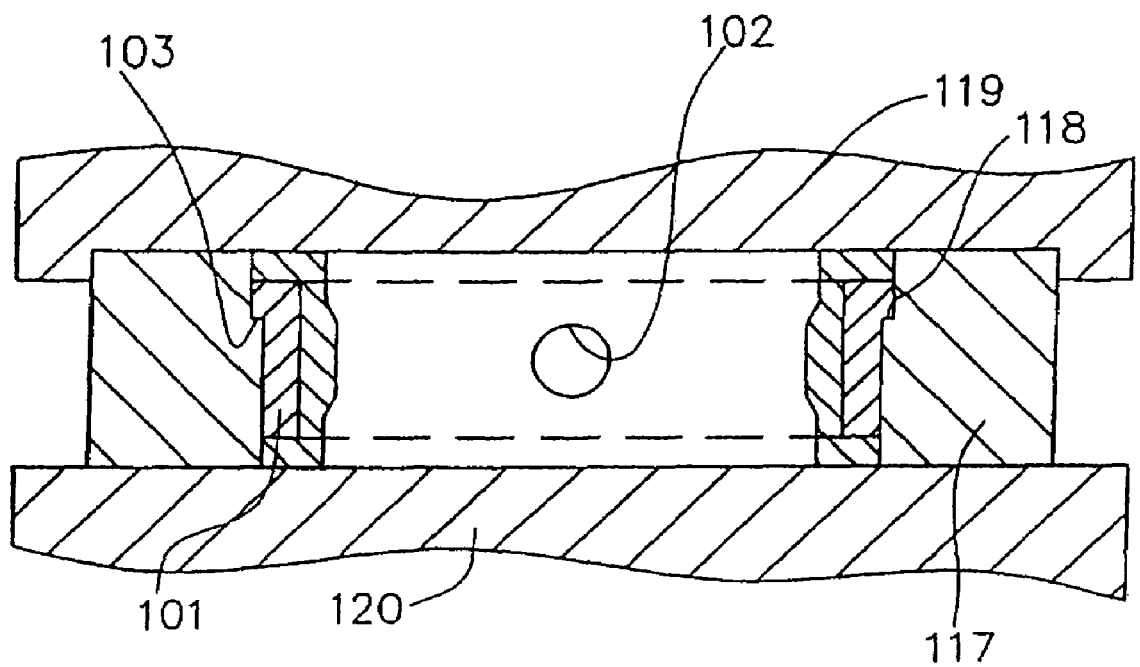
FIG. 10 is a diagram for explaining the essential portions of a conventional molding apparatus for a seat ring with insert.
Figure 11:
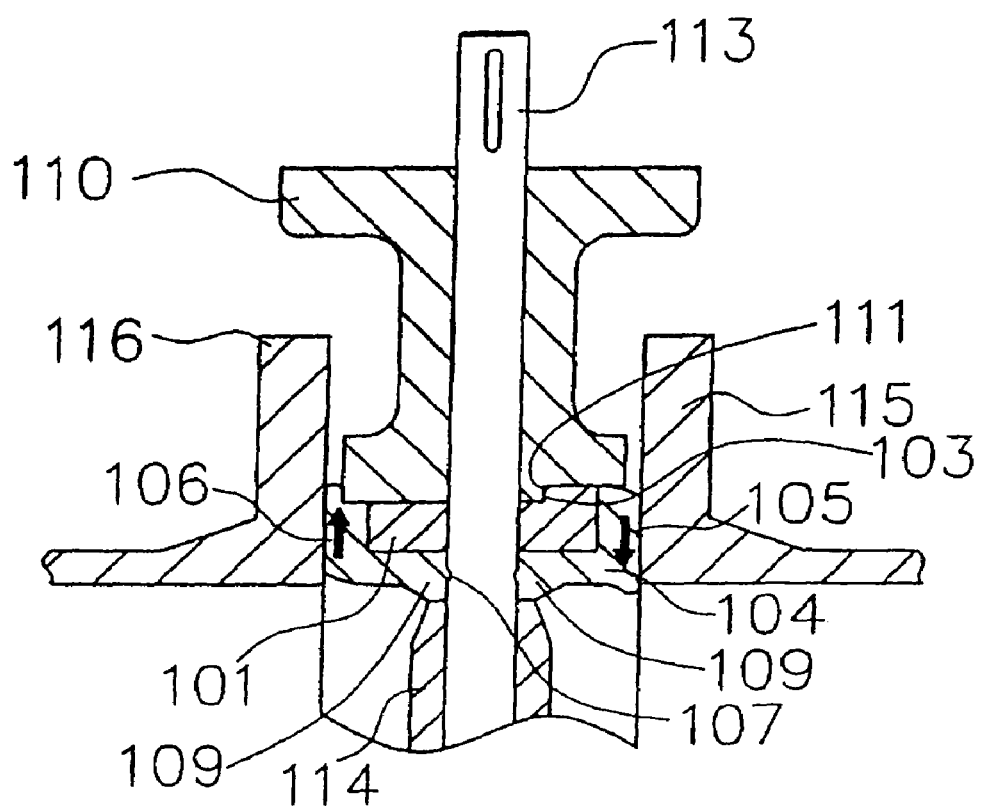
FIG. 11 is a cross-sectional view of essential portions showing a butterfly valve in which a conventional seat ring with insert is fitted, in a state of connection to piping.

Next, a method for manufacturing a seat ring with insert will be explained with reference to FIGS. 6 through 8. First, the insert 1 is engaged with the inner surface of the outer die 32 so that the fitting groove 8 of the insert 1 is engaged with the fitting protrusion 33 in the outer die 32, such fitting protrusion 33 being capable of fitting in the fitting grooves 8 of the insert 1 and being formed on the inner peripheral surface thereof (see FIG. 6). At this time, because the fitting groove 8 and fitting protrusion 33 are engaged with each other, positioning of the insert 1 in each of the tube stem direction and peripheral direction can be performed easily and accurately. Next, the outer die 32 on which the insert 1 is engaged is fitted on a core portion 40 formed on the lower die 39 and sandwiched between the upper die 38 (see FIG. 7). Next, stem cores 34, 35 are fitted in the stem core through holes 36, 37 formed in the outer die 32 and the insert valve shaft holes 6, 7 (see FIG. 8, which shows a cross section shifted 90 degrees from the states in FIGS. 6 and 7). Finally, rubber is injected in the die to mold a seat part 10, and a seat ring with insert is obtained.

At this time, because the insert 1 and outer die 32 are constituted such that the fitting groove 8 on the outer peripheral surface of the insert 1 engages with the fitting protrusion 33, the insert can be positioned both in the tube stem direction and peripheral direction. Therefore, the molding defect rate falls, and moldability is improved. Further, because the valve shaft holes 6, 7 of the insert 1 are not deformed by the stem cores 34, 35, degraded valve stem sealing performance is prevented, leading to reduced operating torque.

While in the present embodiment, the core portion 40 is integrated with the lower die 39, it may be configured as a separate body or integrated with the upper die 38. Further, in another possible configuration, the stem cores 34, 35 configured as separate bodies may be integrated with the outer die 32, and the outer die 32 divided into two.

INDUSTRIAL APPLICABILITY (1) When a butterfly valve of the present invention in which a seat ring with insert is fitted is subject to flange piping or is subjected to a fluid pressure in a fully closed state, even if a load in the downstream side direction is applied only on the seat ring with insert by a valve body subject to a piping flange tightening force or fluid pressure, displacement of a seat ring with insert and seat part deformation is inhibited, deformation of the press contact portion with the seat ring with insert is inhibited, and valve seat sealing performance is improved. The foregoing constitution is particularly effective for butterfly valve piping on one side.

(2) When the butterfly valve of the present invention in which a seat ring with insert is fitted is connected to piping, a suitable degree of compression can be uniformly achieved around the entire periphery without having the seat ring lateral surface irregularly deformed in the inward radial direction or outward radial direction with respect to the tube, thereby improving flange surface sealing performance.

(3) Because the side wall parts on the downstream side of the valve body fitting annular groove of the seat ring with insert are formed to be thin, with a thickness of 2-5 mm, attachment and removal, and assembling of the seat ring with insert becomes extremely easy, without using a divided type valve body.

(4) With the butterfly valve of the present invention in which the seat ring with insert is fitted, positioning of the seat ring with insert in the tube stem direction and peripheral direction can be easily and accurately performed, thereby enabling easy assembly of the butterfly valve. Further, because displacement of the stem core during assembly is prevented, valve stem sealing performance is improved and operating torque is reduced.

(5) When the seat ring with insert is molded, positioning of the insert in the die in a tube stem direction and peripheral direction can be accurately and securely performed, thereby improving moldability.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

The invention claimed is:

1. A seat ring assembly for a butterfly valve wherein the butterfly valve has a valve body which has an inner peripheral surface to be engaged by the seat ring assembly, the seat ring assembly comprising:

a seat part member having an outer circumferential surface defining an annular groove having an annular groove base circumferential surface, and an upstream side wall and a downstream sidewall opposing one another;

an annular insert member having an upstream end, a downstream end, an annular insert interior circumferential surface extending between the upstream end and the downstream end, and an annular insert exterior circumferential surface extending between the upstream end and the downstream end, the annular insert member being fitted in the annular groove of the seat part member with said annular insert interior circumferential surface engaging said annular groove base circumferential surface;

the annular insert exterior circumferential surface in combination with the upstream sidewall and the downstream sidewall of the seat part member comprising a valve body fitting annular groove having the upstream sidewall and the downstream sidewall of the seat part member extending radially outward beyond said annular insert exterior circumferential surface to form sidewalls of the valve body fitting annular groove, the valve body fitting annular groove being configured to conform to the inner peripheral surface of the valve body;

said annular insert member defining opposing first valve stem openings extending radially through the annular insert and said seat part member defining corresponding opposing second valve stem openings aligned with said first valve stem openings and configured for accepting a valve stem;

said annular insert exterior circumferential surface including a step extending circumferentially around said annular insert exterior circumferential surface so as to intersect said first valve stem openings, said step being circumferentially continuous with exceptions of the first valve stem openings, said step being oriented so that a downstream outer diameter of the insert member on downstream side of the step is smaller than an upstream outer diameter of the insert member on an upstream side of the step; and a locking projection being provided on the annular insert interior circumferential surface.

2. The seat ring assembly according to claim 1, wherein the downstream sidewall of the seat part member has a thickness of 2-5 mm.

3. The seat ring assembly according to claim 1, wherein there is provided, extending in an axial direction of the seat ring assembly, one of a fitting groove or fitting protrusion on the annular insert interior circumferential surface.

4. The seat ring assembly according to claim 1, wherein the locking projection on the annular insert interior circumferential surface is disposed at the downstream end so as to define a downstream opening at the downstream end of the annular insert member that is smaller in diameter than an upstream opening defined by the upstream end of the annular insert member.

5. A manufacturing method for manufacturing the seat ring assembly according to claim 3, comprising:

providing a die formed of an outer die, an upper die and a lower die;

seating the annular insert member inside the outer die with said one of a fitting groove or fitting protrusion on the annular insert interior circumferential surface engaging a corresponding one of a fitting protrusion or a fitting groove provided on an inner peripheral surface of the outer die;

sandwiching the outer die between the upper die and the lower die;

fitting stem cores in a stem core holes of the lower die through holes provided in the outer die; and injecting rubber in the die through holes provided in the outer die so as to form the seat part member around the annular insert member.

* * * * *